(12) United States Patent
Richter et al.

(10) Patent No.: US 10,440,148 B1
(45) Date of Patent: *Oct. 8, 2019

(54) CONTENT DELIVERY NETWORK BALANCER

(71) Applicant: Amazon Technologies, Inc., Seattle, WA (US)

(72) Inventors: Stefan Christian Richter, Seattle, WA (US); Nicholas James Benson, Seattle, WA (US); Justin Michael Binns, Auburn, WA (US); Kenneth Thomas Burford, Seattle, WA (US); James Marvin Freeman, II, Mercer Island, WA (US); Marc Joliveau, Seattle, WA (US); Li Tong, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,341

(22) Filed: Jul. 9, 2018

Related U.S. Application Data

(63) Continuation of application No. 14/966,984, filed on Dec. 11, 2015, now Pat. No. 10,038,758.

(60) Provisional application No. 62/249,107, filed on Oct. 30, 2015.

(51) Int. Cl.
| | | |
|---|---|---|
| *G06F 15/173* | (2006.01) | |
| *H04L 29/08* | (2006.01) | |
| *H04L 12/825* | (2013.01) | |
| *H04L 12/26* | (2006.01) | |

(52) U.S. Cl.
CPC ........ *H04L 67/322* (2013.01); *H04L 43/0876* (2013.01); *H04L 47/25* (2013.01); *H04L 67/16* (2013.01)

(58) Field of Classification Search
CPC ... H04L 67/322; H04L 67/16; H04L 43/0876; H04L 47/25
USPC ......................................... 709/223, 224, 226
See application file for complete search history.

(56) References Cited

U.S. PATENT DOCUMENTS

| | | | |
|---|---|---|---|
| 8,819,187 B1 * | 8/2014 | Hofmann | H04L 67/2814 709/219 |
| 8,904,009 B1 | 12/2014 | Marshall | |
| 9,246,965 B1 * | 1/2016 | Stoica | H04L 65/80 |
| 9,497,243 B1 * | 11/2016 | Binns | H04L 65/602 |
| 9,549,043 B1 * | 1/2017 | Stoica | H04L 67/32 |
| 10,038,758 B1 | 7/2018 | Richter et al. | |
| 2001/0052016 A1 | 12/2001 | Skene | |
| 2009/0172167 A1 | 7/2009 | Drai | |
| 2011/0134769 A1 | 6/2011 | Lee | |
| 2011/0185041 A1 | 7/2011 | Hunt | |
| 2012/0151550 A1 | 6/2012 | Zhang | |
| 2012/0215915 A1 | 8/2012 | Sakata | |
| 2014/0122725 A1 | 5/2014 | Batrouni | |

(Continued)

OTHER PUBLICATIONS

U.S. Appl. No. 14/966,984, filed Dec. 11, 2015, Richter, et al.
U.S. Notice of Allowance dated Apr. 12, 2018 issued in U.S. Appl. No. 14/966,984 [AMZ1P047].

*Primary Examiner* — Philip B Tran
(74) *Attorney, Agent, or Firm* — Weaver Austin Villeneuve & Sampson LLP

(57) ABSTRACT

Techniques are described for balancing traffic among content delivery networks (CDNs). A CDN balancer can analyze CDN performance data and determine CDN balancing ratios used to distribute traffic among the CDNs.

21 Claims, 7 Drawing Sheets

(56) References Cited

U.S. PATENT DOCUMENTS

2015/0180995 A1* 6/2015 Hofmann ............ H04L 67/2814
709/213
2015/0256577 A1* 9/2015 Gutierrez Vilaro .........................
H04L 65/4084
709/203

* cited by examiner

CONTENT DELIVERY NETWORK BALANCER

PRIORITY DATA

This patent document is a continuation of and claims priority under 35 U.S.C. 120 to U.S. patent application Ser. No. 14/966,984 entitled Content Delivery Network Balancer filed on Dec. 11, 2015, which claims priority under 35 U.S.C. 119(e) to U.S. Provisional Patent Application No. 62/249,107 entitled Content Delivery Network Balancer filed on Oct. 30, 2015, each of which is incorporated herein by reference in its entirety for all purposes.

BACKGROUND

Consumers have an ever-increasing array of options for consuming media content, in terms of the types of media content (e.g., video, audio, text, etc.), providers of the media content, and devices for consuming the media content. Media content providers are becoming increasingly sophisticated and effective at providing media content quickly and reliably to consumers.

Media content (e.g., movies, television shows, videos, music, and electronic books) is often streamed over networks using adaptive bitrate streaming for playback on a viewer's device. Adaptive bitrate streaming includes determining the viewer device's bandwidth and hardware resources (e.g., available central processing unit (CPU) capacity) in real time and adjusting the quality of the media content that is requested from a media server and played back on the viewer's device to account for changes in the bandwidth and hardware resources. Fragments at different quality levels of the media content detailed in a manifest file are requested individually and stored in a buffer for playback. The manifests can indicate that the fragments should be streamed from a specific content delivery network (CDN). Unfortunately, the performance of CDNs can vary, resulting in an unreliable and/or lower quality playback of the media content if a lower performing CDN is selected to provide the requested fragments rather than a higher performing CDN.

DETAILED DESCRIPTION

This disclosure describes techniques for implementing content delivery network (CDN) balancing that can allow for improved playback of media content on viewer devices. For example, a video streaming service might employ several different CDNs to provide fragments of media content for playback on viewer devices. A CDN balancer can be used to analyze performance characteristics of the available CDNs to generate weights or ratios that can be used to distribute or balance the traffic (i.e., viewer devices requesting fragments) among the CDNs. The weights can be used to provide manifest files such that viewer devices request the fragments of the media content in accordance with the generated weights so that the traffic is better distributed among the CDNs, resulting in more reliable and higher quality playback of the media content.

Figure 1:
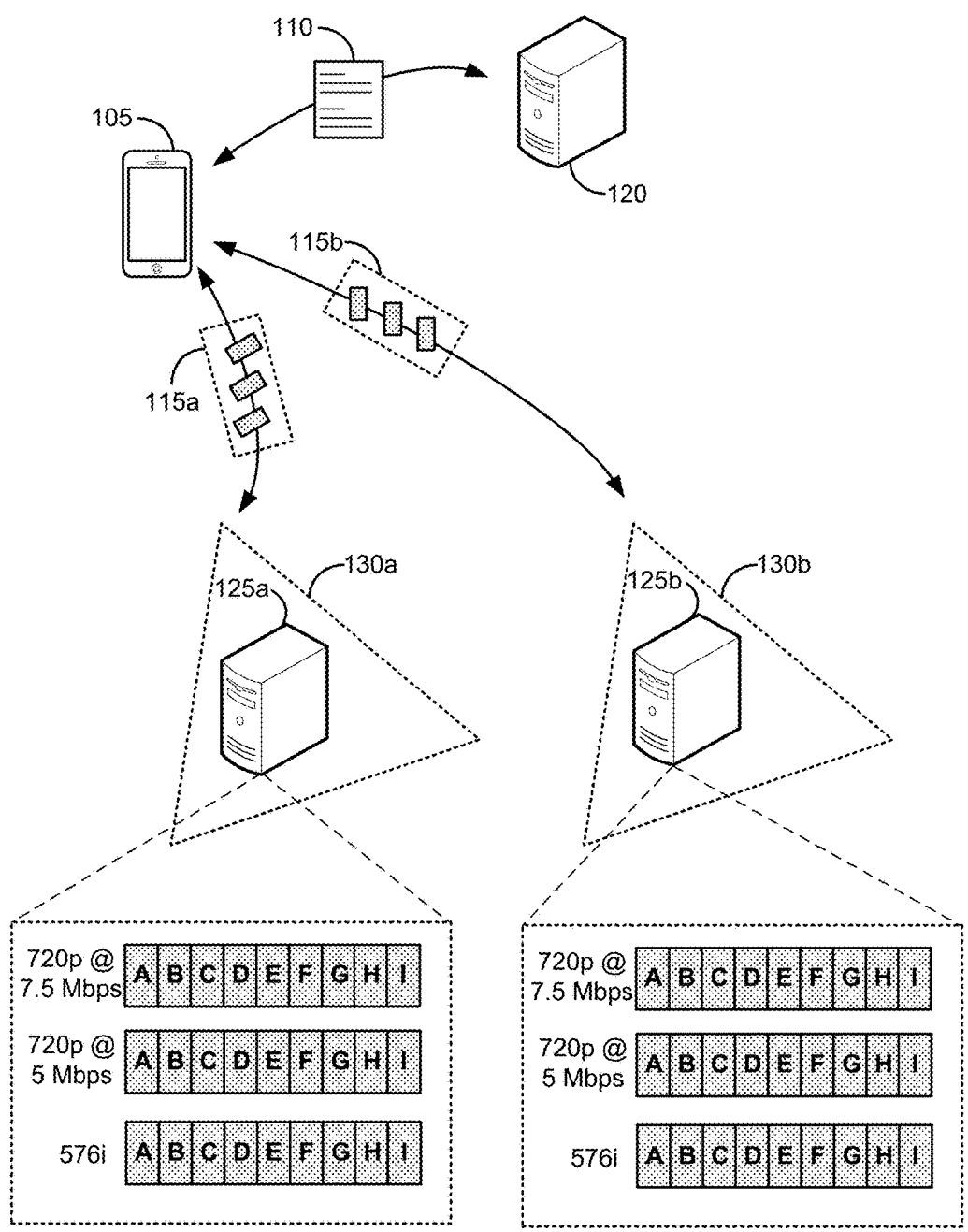
FIG. 1 illustrates an example of content delivery network (CDN) balancing for media content playback.

FIG. 1 illustrates an example of content delivery network balancing for media content playback. As shown in FIG. 1, one of CDNs 130a and 130b can provide fragments 115a or 115b, respectively, of media content to viewer device 105 for playback based on data indicated in manifest file 110 received from media server 120.

Viewer device 105 can be an electronic device, such as a smartphone, that can be used to stream media content for playback using fragments 115a or 115b. As an example, viewer device 105 can request and receive manifest data such as manifest file 110 (which can be markup files or other types of data structures) providing playback options for a requested media content. In the depicted implementation, manifest file 110 can indicate a content delivery network (one of CDNs 130a and 130b) that should be used by viewer device 105 to request fragments (fragments 115a or 115b) of the media content for playback (or an order in terms of priority of CDNs to be used to request the fragments).

For example, viewer device 105 might request playback of media content (e.g., episode #1 of the television show Transparent) by providing a request to media server 120 for a manifest file indicating fragments, or segments, of the playback of the media content available at different quality levels based on bitrates and/or resolutions. The manifest file includes metadata that allows the viewer device to generate properly formatted requests for specific fragments of the media content from a CDN. A sequence of fragments together provides playback of the full media content. Audio portions of the media content can also be provided in fragments. Additional information, such as available subtitles, can also be provided in the manifest file. The fragments can be requested from a CDN specified in manifest file 110. For example, a universal resource locator (URL) can be indicated in manifest file 110 or viewer device 105 can generate a URL using the data in manifest file 110 to contact the CDN to provide the fragments. As a result, even though both CDNs 130a and 130b in FIG. 1 can provide fragments of the media content (fragments 115a and 115b, respectively from fragments A-I at the different quality levels in FIG. 1) for playback, viewer device 105 might request the fragments from edge server 125a of CDN 130a if it is indicated as the CDN to contact in manifest file 110.

In additional detail, media server 120 can include a CDN balancing component that can determine a weighting, or ratios, for CDNs. The CDN balancing ratios can be used to provide manifest files to viewer devices such as viewer device 105 when it requests playback of media content to distribute traffic share, or responsibility for servicing requests for fragments from viewer devices. For example, media server 120 can analyze performance characteristics or data of CDNs 130a and 130b and determine that some traffic should shift from CDN 130a to CDN 130b such that 60% of the traffic should be routed to CDN 130a and 40% of the traffic should be routed to CDN 130b. Performance characteristics can include rebuffer rates (i.e., when playback of media content is interrupted due to a buffer used to store fragments being at a low level), playback error rates (e.g., fatal errors interrupting or terminating playback of the media content), bitrates of fragments requested by viewer devices (e.g., the average, median, etc. of bitrates being requested from the CDN), current number of connections (i.e., the number of viewer devices requesting fragments for playback of media content), available capacity of the CDNs, and other metrics that can affect playback of the media content. Metrics such as the cost to delivery bits for particular CDNs can also be considered. For example, using one CDN might be more expensive than using another CDN, and therefore, the cost to service the traffic can also be considered.

Different combinations of characteristics of viewer devices can have their own CDN balancing ratios. As one example, if viewer device 105 is a smartphone located in New York City and communicating with an Internet connection provided by a first Internet Service Provider (ISP), then smartphones in New York City, N.Y. using the first ISP can have a CDN balancing ratio splitting traffic between CDN 130a and 130b that might be different than the CDN balancing ratio splitting traffic between CDN 130a and 130b for a television in Huntsville, Ala. using the same ISP.

CDN balancing ratios can be determined at threshold time periods (e.g., at periods such as every hour, every 15 minutes, every 24 hours, etc.) using rolling time periods (e.g., based on data indicating performance characteristics of CDNs 130a and 130b collected over the past 24 hours). As an example, the CDN balancer of media server 120 might indicate that traffic should be evenly balanced between CDN 130a and 130b. As a result, if viewer device 105 requests manifest file 110 for the same media content at different times, manifest file 110 might indicate that viewer device should request fragments from CDN 130a, but at another time manifest file 110 might indicate that viewer device should request fragments from CDN 130b. The likelihood of the requests can be evenly split between CDN 130a and 130b (i.e., a 50/50 or 1:1 CDN balancing ratio between the two CDNs), resulting in fragments 115a and 115b being requested and provided from the respective CDNs 130a and 130b at the different times. However, at the next threshold time period (e.g., 1 hour later), media server 120 might analyze the last 24 hours of CDN performance characteristics (which can include new data since the previous analysis) and determine that playback of fragments of media content at viewer devices from CDN 130a has resulted in 5% of playbacks experiencing a rebuffering event and that playback of fragments of media content from CDN 130b has resulted in 10% of playbacks experiencing a rebuffering event. That is, in terms of avoiding rebuffering events, CDN 130a has been more reliable over the last 24 hours than CDN 130b.

As a result, the CDN balancer of media server 120 can shift some of the overall traffic share from CDN 130b to CDN 130a such that CDN 130a can be contacted by 55% of viewer devices and CDN 130b can be contacted by 45% of viewer devices for providing fragments of the media content as new traffic comes in. In this scenario, viewer device 105 has a 55% chance of being provided a manifest file indicating that CDN 130a should be used to request fragments and a 45% chance of being provided a manifest file indicating that CDN 130b should be used. Though only two CDNs are used in this example, any number of CDNs can be used (e.g., three, ten, etc.). Consequently, traffic may be proportioned among the CDNs based on the CDN balancing ratios that are determined based on the CDN performance characteristics.

Figure 2:
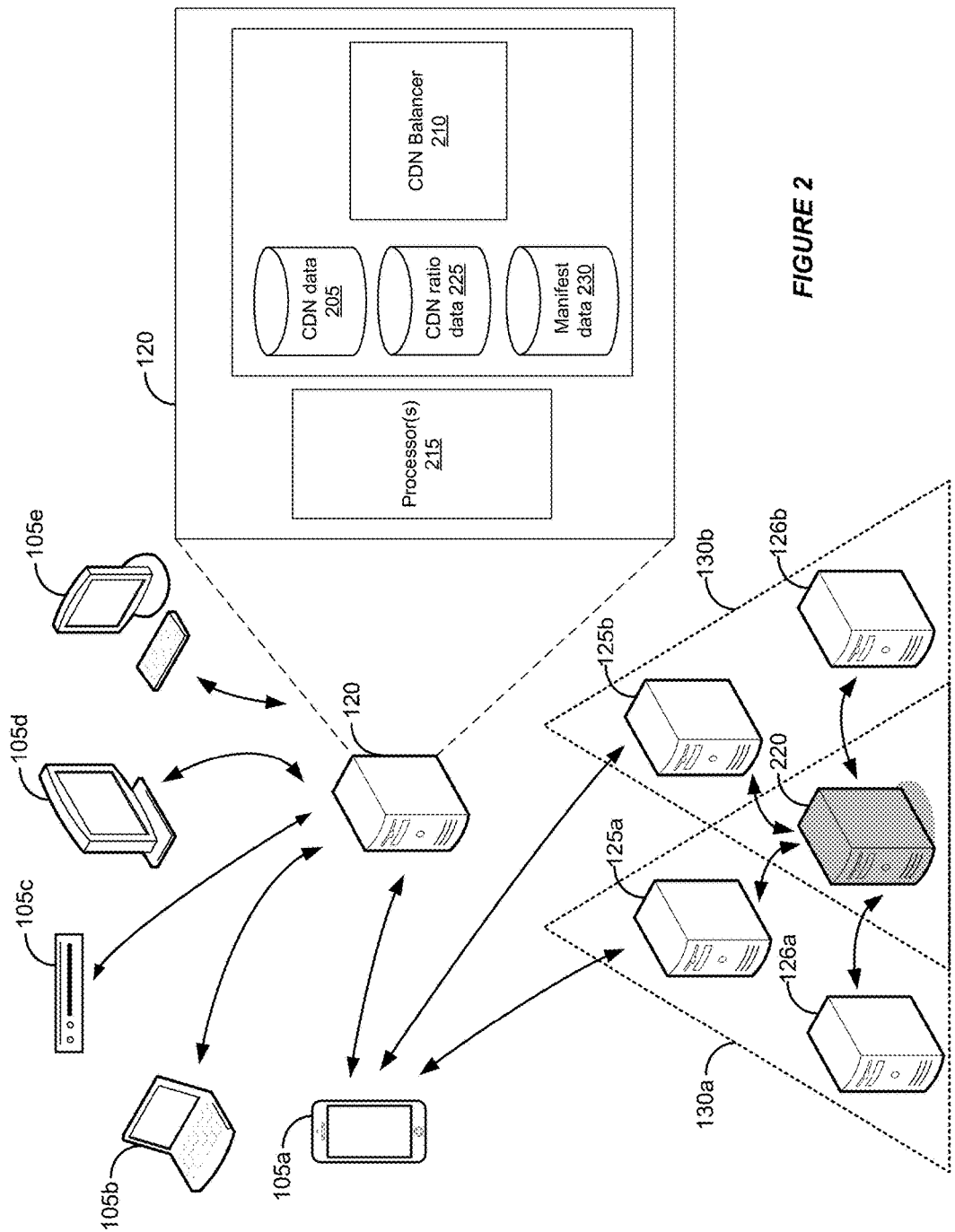
FIG. 2 illustrates an example of a computing environment in which CDN balancing can be used for media content playback.

FIG. 2 illustrates an example of a computing environment in which CDN balancing can be used for media content playback. The computing environment of FIG. 2 includes media server 120 which can be used to provide manifest files for media content for playback on viewer devices 105a-e by indicating which of CDNs 130a and 130b that the viewer devices 105a-e should contact to request fragments of the media content for playback.

Viewer device 105a is a smartphone, viewer device 105b is a laptop, viewer device 105c is a set-top box, viewer device 105d is a television, and viewer device 105e is a desktop computer. Other types of devices such as tablets, wearable devices (e.g., smart watches), virtual reality headsets, etc. may also be included in the computing environment.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Media server 120 and CDNs 130a and 130b can be part of a content delivery system that conforms to any of a wide variety of architectures. The functionality and components of media server 120 and CDNs 130a and 130b can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content and data related to the media content, including content providers, internet service providers (ISPs), providers of content delivery networks (CDNs), etc. The functionality described herein also may be implemented by one or more different entities. For example, the functionality to provide playback of media content can be integrated into a video player or software client under control of one entity (e.g., on viewer devices 105a-e), integrated into a separate app from another entity, implemented in an edge server or content server of a CDN, a server of an ISP, etc. In some implementations, media server 120 may be integrated with one or both of CDNs 130a and 130b. Media server 120 can also communicate with CDNs 130a and 130b, for example, to receive data or determine data representing performance characteristics of the CDNs. Media server 120 can also receive data from viewer devices 105a-e representing the playback of media content requested from CDNs 130a and 130b, for example, an indication of rebuffering, fatal errors, requested bitrates, and other metrics disclosed herein.

Media server 120 can include various types of logic used to provide manifest files for media content used by viewer devices 105a-e to generate requests for fragments to provide playback, as previously discussed. In FIG. 2, media server 120 can include CDN data 205 representing performance characteristics of CDNs 130a and 130b, CDN ratio data 225 indicating CDN balancing ratios, and manifest data 230

(e.g., metadata to be provided in the manifest files). Media server 120 can also include processor 215, CDN balancer 210, memory, and other hardware components to analyze the CDN performance data in CDN data 205. Media server 120 can then generate CDN balancing ratios to store in CDN ratio data 225 based on the CDN performance data. The manifest files can be provided to viewer devices 105*a-e* to use the metadata in manifest data 230 to distribute traffic in accordance with the CDN balancing ratios.

As previously discussed, the CDN balancing ratios can indicate the ratio (or percentage, portion, number, etc.) of viewer devices 105*a-e* to be distributed between CDNs 130*a* and 130*b*. That is, the distribution of traffic routed to CDNs can be based on the CDN balancing ratios. CDNs 130*a* and 130*b* can conform to a wide variety of architecture. In the example of FIG. 2, edge servers 125*a* and 126*a* of CDN 130*a* and edge servers 125*b* and 126*b* of CDN 130*b* can be contacted by viewer devices 105*a-f* to provide fragments of media content for playback. CDNs 130*a* and 130*b* represent different hierarchies of servers with some servers shared and some servers distinct from other CDNs. For example, in FIG. 2, edge servers 125*a*, 125*b*, 126*a*, and 126*b* can be unique to the respective CDNs, but each CDN 130*a* and 130*b* might include the same origin server 220. Edge servers 125*a*, 125*b*, 126*a*, and 126*b* can provide caching of recently requested fragments of media content and contact origin server 220 to request fragments that are not in their respective caches if those fragments are requested by a viewer device. Any number of "middle tiers" of servers between origin server 220 and edge servers 125*a*, 125*b*, 126*a*, and 126*b* can also provide intermediate levels of caching and other functionality to provide media content playback at viewer devices 105*a-e*.

CDN balancer 210 of media server 120 can analyze CDN data 205 to determine CDN balancing ratios and use manifest data 230 to generate and provide manifest files to viewer devices 105*a-e* based on the CDN balancing ratios. For example, if the CDN balancing ratios indicate that for viewer devices 105*a-e* that 20% of viewer devices should request fragments of the requested media content from CDN server 130*a* and that 80% of viewer devices should request fragments from CDN server 130*b*, then when viewer device 105*a* requests its manifest file from media server 120, media server 120 can provide the manifest file indicating that it should try to request the fragments from CDN 130*a* (e.g., from edge server 125*a*). By contrast, when viewer devices 105*b-e* request their manifest files (for the same or different media content), media server 120 can provide each manifest files indicating that they should request their fragments from CDN 130*b*. As a result, the traffic (i.e., viewer devices requesting fragments of media content for playback) between the CDNs can be distributed based on the CDN balancing ratios determined by CDN balancer 210. This allows for a better distribution of traffic between CDNs 130*a* and 130*b* based on the performances of the CDNs. If the performance of CDN 130*b* begins to degrade, traffic can incrementally be shifted to CDN 130*a* by continually updating the CDN balancing ratios to gradually increase the proportion of the traffic being routed to CDN 130*a* if its performance is determined to be better. As a result, viewer devices can be provided a better playback experience when using the video streaming service.

Figure 3:
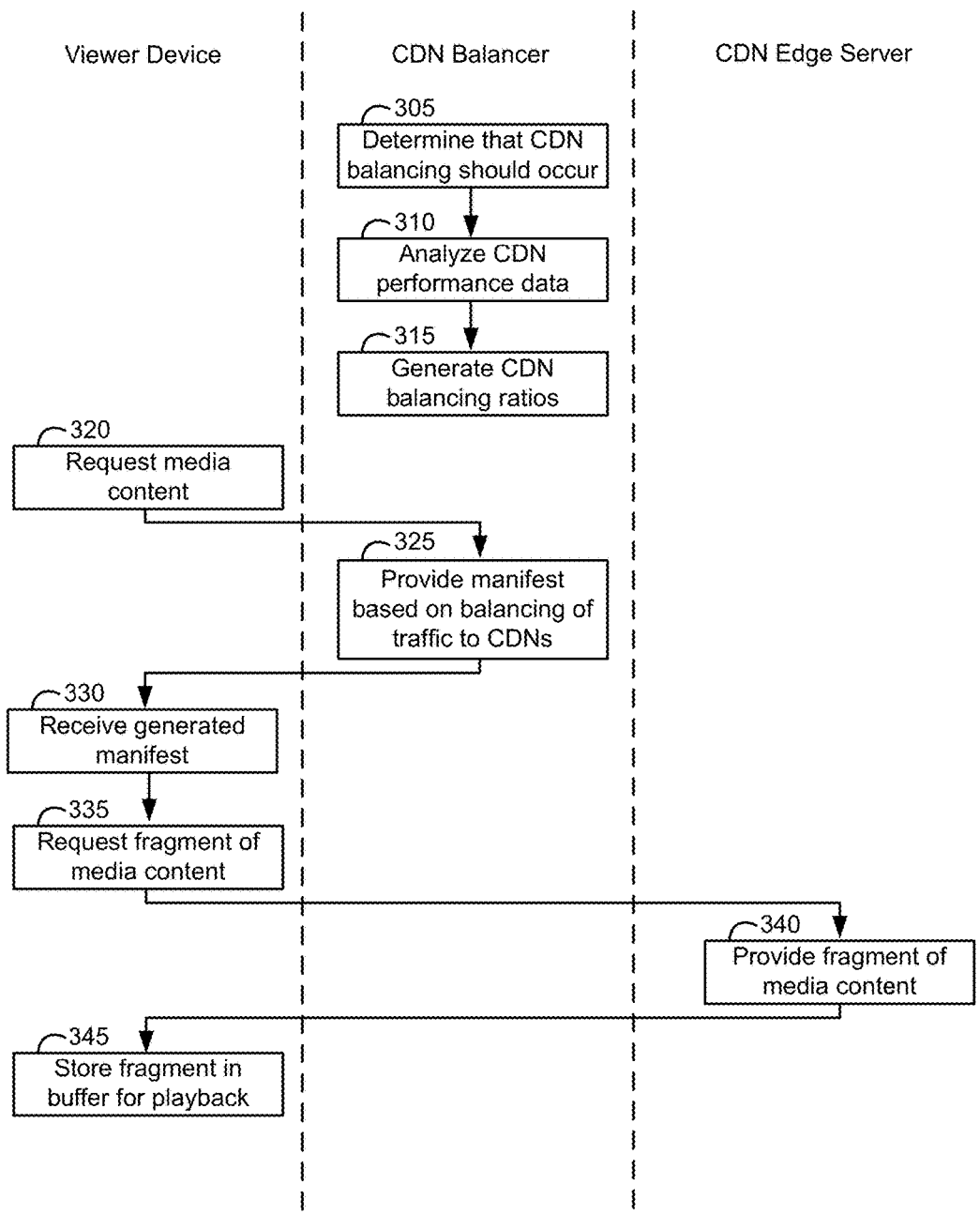
FIG. 3 is a flowchart illustrating determining CDN balancing for media content playback.

A specific implementation will now be described with reference to FIG. 1, the computing environment of FIG. 2, and the flow diagram of FIG. 3. In FIG. 3, media server 120 can determine that CDN balancing should occur to distribute traffic between CDNs 130*a* and 130*b* (305). For example, CDN balancing ratios can be determined at threshold time periods (e.g., every hour). In some implementations, rather than determining the CDN balancing ratios at threshold time periods, a threshold number of new connections since the last time the CDN balancing ratio was updated can be used. For example, every 10,000 connections to a CDN can result in a significant amount of performance data that can be used to update some CDN balancing ratios. In some implementations, different combinations of viewer device characteristics might have their CDN balancing ratios updated differently. For example, smartphones in Arkansas might have their corresponding CDN balancing ratios update every 24 hours due to a lower volume of new connections to CDNs since the last time CDN balancing occurred from a lower number of viewer devices meeting those viewer device characteristics whereas smartphones in California might have their corresponding CDN balancing ratios update every 10,000 requests for manifest files. In some implementations, a default time period might be used (e.g., every 24 hours), but if the number of requests exceed a threshold number, then the CDN balancing ratios can be updated if it is before the next 24 hour threshold time period.

Figure 4:
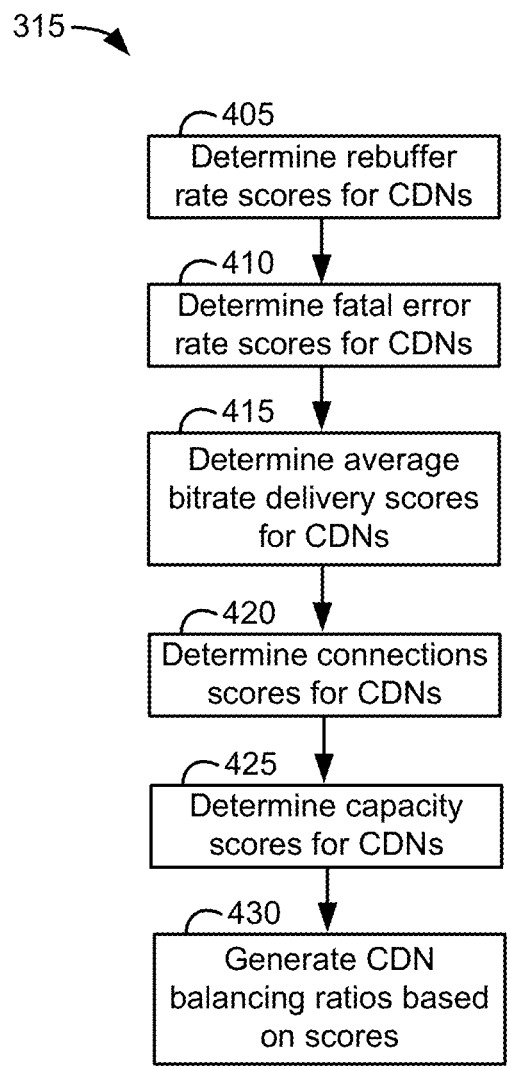
FIG. 4 is a flowchart illustrating determining CDN balancing ratios for CDNs for media content playback.

Media server 120 can analyze CDN performance data (310) and determine the CDN balancing ratios (315) that can be used to balance traffic between different CDNs. For example, media server 120 can receive data providing information regarding the performance of the CDNs from viewer devices and/or the CDNs themselves. FIG. 4 is a flowchart illustrating determining CDN balancing ratios for CDNs for media content playback. In FIG. 4, scores for each CDN can be determined for a variety of different metrics regarding the performances of the CDNs. CDN balancer 210 of FIG. 2 can determine scores for rebuffer rates (405), fatal error rates (410), average, median, etc. of bitrates corresponding to the fragments requested by viewer devices (415), scores for number of connections (i.e., number of viewing devices requesting fragments from the CDN) to CDNs (420), and scores corresponding to capacities of the CDNs (425). CDN balancing ratios can be generated based on the scores (315, 430).

Figure 5:
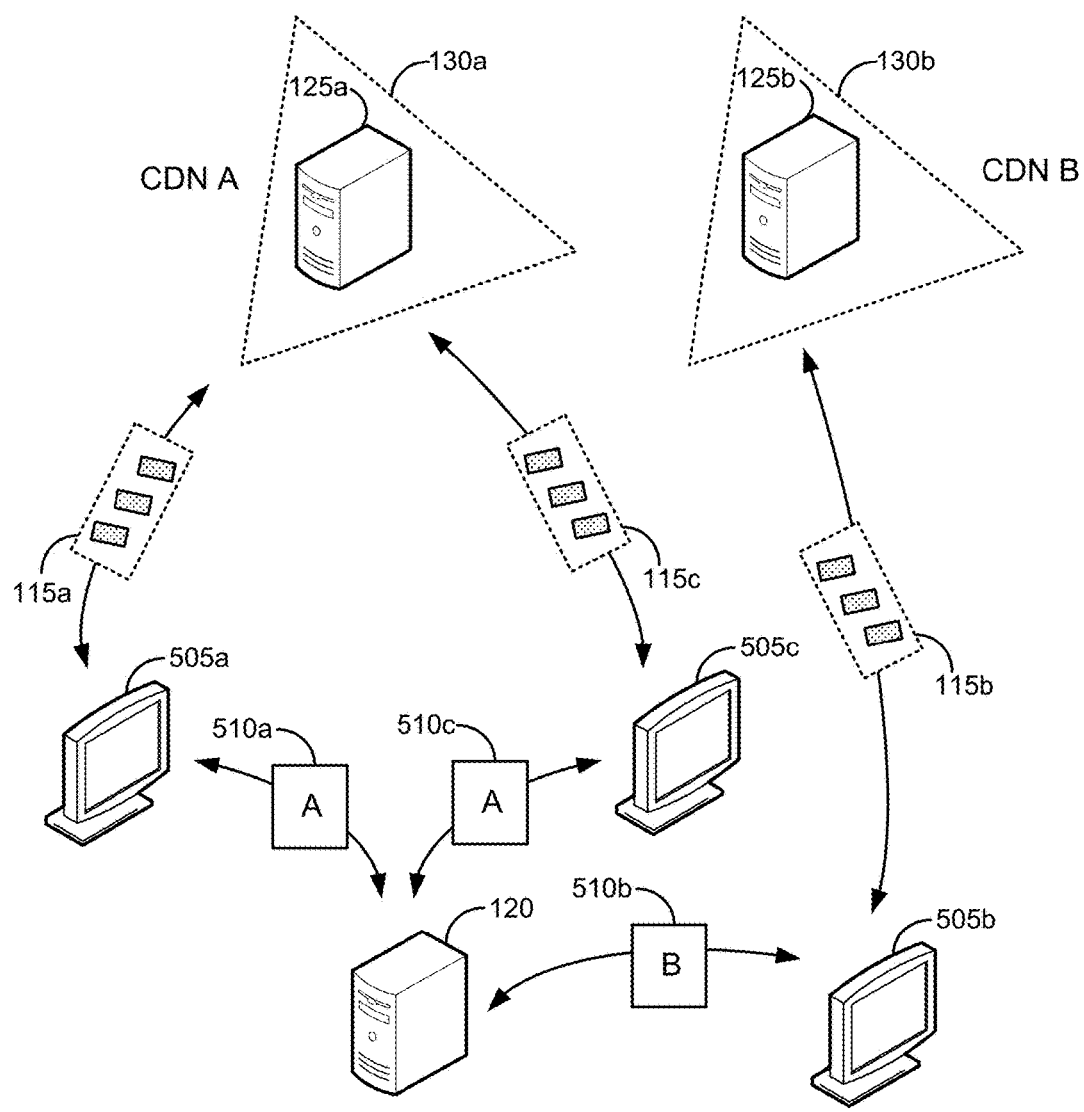
FIG. 5 illustrates CDN balancing for media content playback.

As an example, FIG. 5 illustrates CDN balancing for media content playback. In FIG. 5, the CDN balancing ratios can initially indicate that viewer devices should generally be evenly split between CDNs 130*a* and 130*b* (i.e., each CDN receiving 50% of the traffic). As a result, if two viewer devices request manifest files from media server 120, one viewer device (e.g., viewer device 505*a*) might be provided manifest file 510*a* indicating that it should request fragments 115*a* of media content from CDN 130*a* and the other viewer device (e.g., viewer device 505*b*) might be provided manifest file 510*b* indicating that it should request fragments 115*b* of media content from CDN 130*b*. At another time (e.g., when media server 120 determines that CDN balancing ratios should be recalculated), CDN performance data can be analyzed. The CDN performance data might include new data since the initial time when the CDN balancing ratios were calculated to be evenly split between CDNs 130*a* and 130*b*, which can result in new CDN balancing ratios.

For example, the CDN performance data can indicate that 5% of viewer devices requesting fragments from CDN 130*a* experienced rebuffering events during playback and that 10% of viewer devices requesting fragments from CDN 130*b* experienced rebuffering events during playback. The CDN providing the better viewing experience can be assigned a score for the metric based on the differences between its performance compared to the performances of other CDNs in that metric. In the prior example, CDN balancer 210 can generate a score of 5 points for CDN 130a since its rebuffer rate is 5 percentage points lower than the rebuffer rate of CDN 130b. That is, the score can be based on the difference in percentages between metrics, however, in other implementations, scores can be calculated in other ways. For example, a single point may be provided to the best-performing CDN in the metric, each CDN might get a score for the metric, etc. CDN balancer 210 can generate scores for each of the different types of performance data or metrics. As another example, if 3% of viewer devices experience a fatal error interrupting playback when requesting fragments from CDN 130a and 1% of viewer devices experience a fatal error, then CDN 130b can be provided a score of 2 points since its fatal error rate is 2 percentage points lower than CDN 130a.

The scores can be aggregated to provide aggregated scores for each of CDN 130a and 130b. If the aggregated scores result in CDN 130a having a score of 66 and CDN 130b having a score of 34, then the CDN balancing ratio can indicate that CDN 130a is to be provided 66% of traffic and CDN 130b is to be provided 34% of the traffic. This results in traffic to CDN 130a set to increase from 50% to 66% of the total traffic and CDN 130b set to decrease from 50% to 34% of the total traffic. As a result, some of the responsibility for servicing the traffic is shifted from CDN 130b to CDN 130a after the CDN balancing ratios are determined. This may result in a better viewing experience for more viewer devices since CDN 130a has a higher score representing better performance.

Consequently, in FIG. 5, a third viewer device 505c can request a manifest file from media server 120 and be provided manifest file 510c indicating that it should request fragments 115c of the media content from CDN 130a rather than CDN 130b since the CDN balancing ratio indicates that CDN 130a should receive more traffic than CDN 130b. In some implementations, media server 120 can count the number of viewer devices requesting manifest files and provide the manifest files such that the CDN balancing ratio is maintained.

In some implementations, the types of performance data might be weighted differently to contribute more to the aggregated score. For example, a 1% difference in fatal error rates can be emphasized or weighted more than a 5% difference in rebuffering rates such that a CDN having a 1% fatal error rate with a 10% rebuffering rate can be provided a higher traffic load (i.e., a higher portion of the CDN balancing ratio) than a CDN having a 3% fatal error rate with a 1% rebuffering rate.

Referring again to FIG. 3, a viewer device can request media content to stream from the video streaming service (320) and provide the request to media server 120 including CDN balancer 210. As previously discussed, media server 120 can then provide a manifest file based on the CDN balancing ratios to ensure that traffic is distributed among the CDNs (325). For example, media server 120 can generate the manifest file or select a manifest file indicating the CDN to use, or a priority order of CDNs to use with the highest priority CDN selected based on the CDN balancing ratios, as previously discussed. Other CDNs in the priority order can also be based on the CDN balancing ratios, with the CDNs associated with the higher scores or ratios being ranked higher. The viewer device can then receive the manifest file (330) and request fragments from the indicated CDN indicated therein (335). As a result, the CDN can provide the requested fragments (340) and the viewer device can store the fragments in a buffer for playback (345). In some implementations, multiple manifest files can be used to provide the metadata for forming requests for fragments of the media content. For example, one manifest file can provide the metadata regarding which CDN to use (or the priority order) and another manifest file can provide data for forming URLs for the CDN.

In some implementations, the priority order of CDNs can include multiple references to a CDN. For example, CDN A, B, and C can be three different CDNs that a viewer device can contact to receive fragments. The priority order for the CDNs as detailed in a manifest file can be A, B, A, and C. That is, CDN A should be contacted first, followed by CDN B, followed by CDN A again before contacting CDN C.

Figure 6:
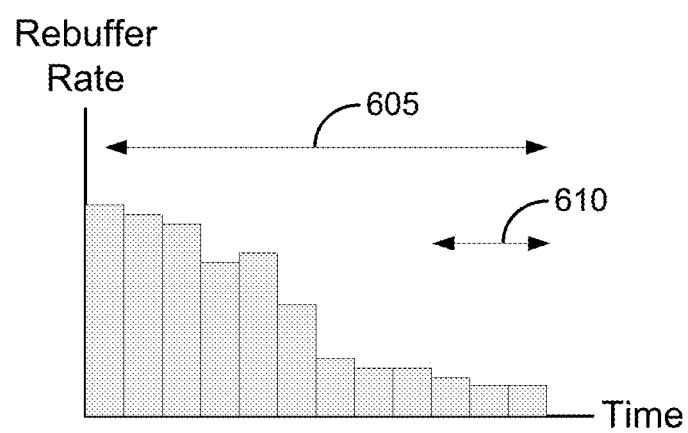
FIG. 6 illustrates an example of weighted time periods within rolling time periods.

In some implementations, a subset of data within the rolling time period (or threshold time period) can be weighted to emphasize the subset of data more than other data within the same period. The subset of data can be weighted such that it influences more of the score for the CDN performance data than the other data within that period. FIG. 6 illustrates an example of weighted time periods within rolling time periods. In FIG. 6, rolling time period 605 may represent the last 24 hours of CDN performance data and weighted time period 610 may represent the most recent 6 hours of the CDN performance data. The most recent 6 hours may be weighted to provide 40% of the score despite being only 25% of the total time within rolling time period 605. Emphasizing more recent CDN performance data can be useful as it represents more current conditions, and therefore, may be more influential in determining the traffic share between CDNs. For example, recent rebuffer rates may be more useful than older rebuffer rates, and therefore, more important when determining how to balance traffic among CDNs.

As another example, the subset of data within the rolling time periods can be at particular times, for example, a designated time period (e.g., 4:00 PM to 9:00 PM) or day (e.g., Sundays). This may allow for known usage patterns to be emphasized in the CDN balancing. For example, CDN performance data during "prime time" (or peak) hours can be more emphasized than data at other times within the rolling time period.

In some implementations, the traffic shift among CDNs can be restricted to a maximum (or minimum) threshold traffic shift. For example, each time the CDN balancing ratios are determined, a maximum of 1% difference may be enforced. As a result, if CDN 130a is originally at 50% and CDN 130b is originally at 50%, the next time the CDN balancing ratios are updated, CDN 130a can at most be 51% and CDN 130b can at a minimum be 49%. At a following time, CDN 130a can be increased to 52% and CDN 130b can be decreased to 48%. This allows for an incremental change in the traffic distributed among the CDNs, decreasing the likelihood of oversaturating one CDN with an unexpectedly large increase in traffic.

In some implementations, the allowable traffic shift used to update the CDN balancing ratios can also be adjusted based on the capacity information of the CDNs. For example, if more traffic should be shifted to CDN 130a based on the CDN performance characteristics as previously discussed, but its available capacity has decreased to a threshold number (e.g., its available capacity is now 10% of its total capability), then the traffic shift can be adjusted to be lower (e.g., 0.5% rather than 1%). This may allow for another preventative method of traffic shifting to avoid saturating one CDN over others such that one CDN becomes oversaturated and "breaks," resulting in a poor playback experience until the next time the CDN balancing ratios are updated.

Figure 7:
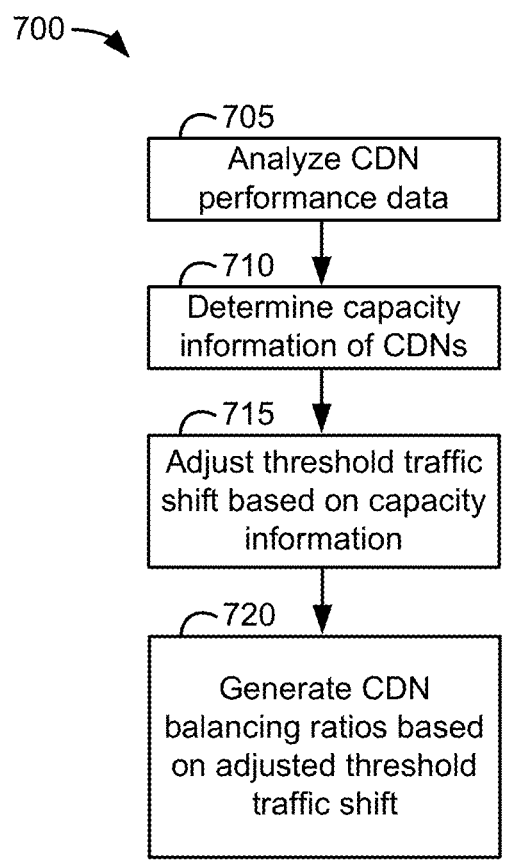
FIG. 7 is a flowchart illustrating adjusting a threshold traffic shift.

As an example, FIG. 7 is a flowchart illustrating adjusting a threshold traffic shift. In FIG. 7, CDN performance data can be analyzed (705), as previously discussed, to determine CDN balancing ratios. CDN balancer 210 can also determine capacity information such as available capacities or the currently used portions of the capacities of each of the CDNs (710). The capacity information of the CDNs can be used to adjust a threshold traffic shift such that the maximum amount of traffic to be shifted to a CDN can be reduced (715), resulting in the CDN balancing ratios being generated to take into account the adjusted threshold traffic shift (720).

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
   determining a first balance represented by a first plurality of weights or ratios for distributing content delivery traffic among a plurality of content delivery networks (CDNs) based on first performance data representing operation of the CDNs;
   providing first manifest data to first client devices, the first manifest data being configured to enable the first client devices to access first media content via the CDNs in accordance with a first weight or ratio in the first plurality of weights or ratios;
   providing second manifest data to second client devices, the second manifest data being configured to enable the second client devices to access the first media content via the CDNs in accordance with a second weight or ratio in the first plurality of weights or ratios;
   determining a second balance represented by a second plurality of weights or ratios for distributing content delivery traffic among the CDNs based on second performance data representing operation of the CDNs, wherein the first performance data represent operation of the CDNs during a first time period and the second performance data represent operation of the CDNs during a second time period that is later than the first time period; and
   providing third manifest data to third client devices, the third manifest data being configured to enable the third client devices to access second media content via the CDNs in accordance with a first weight or ratio in the second plurality of weights or ratios; and
   providing fourth manifest data to fourth client devices, the fourth manifest data being configured to enable the fourth client devices to access the second media content via the CDNs in accordance with a second weight or ratio in the second plurality of weights or ratios.

2. The method of claim 1, wherein the second time period is overlapping with the first time period.

3. The method of claim 1, wherein determining the second balance is responsive to elapse of a period of time since determining the first balance, or wherein determining the second balance is responsive to occurrence of a first number of client device connections to one or more of the CDNs since determining the first balance.

4. The method of claim 1, wherein the first and second performance data represent one or more of (1) rebuffering events for streaming sessions associated with the CDNs, (2) fatal errors for streaming sessions associated with the CDNs, (3) bitrate information for streaming sessions associated with the CDNs, (4) number of streaming sessions for each of the CDNs, or (5) capacity information for each of the CDNs.

5. The method of claim 1, wherein the first and third client devices are represented by a single set of device characteristics, and wherein the first and second performance data only represent streaming sessions involving client devices represented by the single set of device characteristics.

6. The method of claim 1, wherein the first client devices are represented by a first set of device characteristics and the third client devices are represented by a second set of device characteristics that is different from the first set of device characteristics, wherein the first performance data only represent streaming sessions involving client devices represented by the first set of device characteristics, and wherein the second performance data only represent streaming sessions involving client devices represented by the second set of device characteristics.

7. The method of claim 1, wherein the first manifest data represent a first priority ordering of the CDNs, and wherein the second manifest data represent a second priority ordering of the CDNs.

8. The method of claim 1, wherein the first and second performance data correspond to a rolling time period, the rolling time period including a less recent portion and a more recent portion, and wherein the first and second performance data corresponding to the more recent portion of the rolling time period are weighted more than the first and second performance data corresponding to the less recent portion of the rolling time period in determining the first and second balances.

9. The method of claim 1, wherein the second balance of the content delivery traffic results in a traffic shift among the CDNs relative to the first balance of the content delivery traffic, and wherein the traffic shift is limited by a maximum threshold traffic shift, or wherein the traffic shift is at least as great as a minimum threshold traffic shift.

10. The method of claim 1, wherein the second balance of the content delivery traffic results in a traffic increase for a first CDN relative to the first balance of the content delivery traffic, the traffic increase to the first CDN being based on capacity information for the first CDN.

11. A system, comprising one or more computing devices configured to:
    determine a first balance represented by a first plurality of weights or ratios for distributing content delivery traffic among a plurality of content delivery networks (CDNs) based on first performance data representing operation of the CDNs;
    provide first manifest data to first client devices, the first manifest data being configured to enable the first client devices to access first media content via the CDNs in accordance with a first weight or ratio in the first plurality of weights or ratios;
    provide second manifest data to second client devices, the second manifest data being configured to enable the second client devices to access the first media content via the CDNs in accordance with a second weight or ratio in the first plurality of weights or ratios;

determine a second balance represented by a second plurality of weights or ratios for distributing content delivery traffic among the CDNs based on second performance data representing operation of the CDNs, wherein the first performance data represent operation of the CDNs during a first time period and the second performance data represent operation of the CDNs during a second time period that is later than the first time period; and provide third manifest data to third client devices, the third manifest data being configured to enable the third client devices to access second media content via the CDNs in accordance with a first weight or ratio in the second plurality of weights or ratios; and provide fourth manifest data to fourth client devices, the fourth manifest data being configured to enable the fourth client devices to access the second media content via the CDNs in accordance with a second weight or ratio in the second plurality of weights or ratios.

12. The system of claim 11, wherein the second time period is overlapping with the first time period.

13. The system of claim 11, wherein the one or more computing devices are configured to determine the second balance responsive to elapse of a period of time since determining the first balance, or responsive to occurrence of a first number of client device connections to one or more of the CDNs since determining the first balance.

14. The system of claim 11, wherein the first and second performance data represent one or more of (1) rebuffering events for streaming sessions associated with the CDNs, (2) fatal errors for streaming sessions associated with the CDNs, (3) bitrate information for streaming sessions associated with the CDNs, (4) number of streaming sessions for each of the CDNs, or (5) capacity information for each of the CDNs.

15. The system of claim 11, wherein the first and third client devices are represented by a single set of device characteristics, and wherein the first and second performance data only represent streaming sessions involving client devices represented by the single set of device characteristics.

16. The system of claim 11, wherein the first client devices are represented by a first set of device characteristics and the third client devices are represented by a second set of device characteristics that is different from the first set of device characteristics, wherein the first performance data only represent streaming sessions involving client devices represented by the first set of device characteristics, and wherein the second performance data only represent streaming sessions involving client devices represented by the second set of device characteristics.

17. The system of claim 11, wherein the first manifest data represent a first priority ordering of the CDNs, and wherein the second manifest data represent a second priority ordering of the CDNs.

18. The system of claim 11, wherein the first and second performance data correspond to a rolling time period, the rolling time period including a less recent portion and a more recent portion, and wherein the first and second performance data corresponding to the more recent portion of the rolling time period are weighted more than the first and second performance data corresponding to the less recent portion of the rolling time period in determining the first and second balances.

19. The system of claim 11, wherein the second balance of the content delivery traffic results in a traffic shift among the CDNs relative to the first balance of the content delivery traffic, and wherein the traffic shift is limited by a maximum threshold traffic shift, or wherein the traffic shift is at least as great as a minimum threshold traffic shift.

20. The system of claim 11, wherein the second balance of the content delivery traffic results in a traffic increase for a first CDN relative to the first balance of the content delivery traffic, the traffic increase to the first CDN being based on capacity information for the first CDN.

21. A computer program product comprising one or more non-transitory computer-readable media having computer instructions stored therein, the computer program instructions being configured such that, when executed by one or more computing devices, the computer program instructions cause the one or more computing devices to:

determine a first balance represented by a first plurality of weights or ratios for distributing content delivery traffic among a plurality of content delivery networks (CDNs) based on first performance data representing operation of the CDNs;

provide first manifest data to first client devices, the first manifest data being configured to enable the first client devices to access first media content via the CDNs in accordance with a first weight or ratio in the first plurality of weights or ratios;

provide second manifest data to second client devices, the second manifest data being configured to enable the second client devices to access the first media content via the CDNs in accordance with a second weight or ratio in the first plurality of weights or ratios;

determine a second balance represented by a second plurality of weights or ratios for distributing content delivery traffic among the CDNs based on second performance data representing operation of the CDNs, wherein the first performance data represent operation of the CDNs during a first time period and the second performance data represent operation of the CDNs during a second time period that is later than the first time period; and provide third manifest data to third client devices, the third manifest data being configured to enable the third client devices to access second media content via the CDNs in accordance with a first weight or ratio in the second plurality of weights or ratios; and provide fourth manifest data to fourth client devices, the fourth manifest data being configured to enable the fourth client devices to access the second media content via the CDNs in accordance with a second weight or ratio in the second plurality of weights or ratios.

* * * * *